(12) United States Patent
Elend

(10) Patent No.: US 9,954,892 B2
(45) Date of Patent: Apr. 24, 2018

(54) CONTROLLER AREA NETWORK (CAN) DEVICE AND METHOD FOR CONTROLLING CAN TRAFFIC

(71) Applicant: NXP B.V., Eindhoven (NL)

(72) Inventor: Bernd Uwe Gerhard Elend, Hamburg (DE)

(73) Assignee: NXP B.V., Eindhoven (NL)

( * ) Notice: Subject to any disclaimer, the term of this patent is extended or adjusted under 35 U.S.C. 154(b) by 52 days.

(21) Appl. No.: 14/868,252

(22) Filed: Sep. 28, 2015

(65) Prior Publication Data
US 2017/0093908 A1    Mar. 30, 2017

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |
| H04L 1/00 | (2006.01) |
| H04L 12/40 | (2006.01) |
| H04L 29/08 | (2006.01) |

(52) U.S. Cl.
CPC ........ H04L 63/1458 (2013.01); H04L 1/0045 (2013.01); H04L 12/40 (2013.01); H04L 12/40045 (2013.01); H04L 67/12 (2013.01); H04L 2012/40215 (2013.01)

(58) Field of Classification Search
CPC .... H04L 63/1458; H04L 1/0045; H04L 12/40
See application file for complete search history.

(56) References Cited

U.S. PATENT DOCUMENTS

| | | | |
|---|---|---|---|
| 6,041,039 A * | 3/2000 | Kilkki | H04L 12/5602 370/230 |
| 6,665,601 B1 * | 12/2003 | Nielsen | H04L 12/40 701/50 |
| 8,213,321 B2 | 7/2012 | Butts et al. | |
| 8,788,731 B2 | 7/2014 | Peirce et al. | |
| 8,955,130 B1 | 2/2015 | Kalintsev et al. | |
| 2004/0153682 A1 * | 8/2004 | Fuehrer | H04L 12/4015 713/400 |

(Continued)

FOREIGN PATENT DOCUMENTS

WO    2014/199687 A1    12/2014

OTHER PUBLICATIONS

Lin, Chung-Wei et al.; "Cyber-Security for the Controller Area Network (CAN) Communication Protocol"; ISBN: 978-1-62561-001-0; p. 80-92; 2012.

(Continued)

*Primary Examiner* — Noura Zoubair
*Assistant Examiner* — Arezoo Sherkat
(74) *Attorney, Agent, or Firm* — Rajeev Madnawat

(57) ABSTRACT

Embodiments of a device and method are disclosed. In an embodiment, a method for controlling CAN traffic is disclosed. The method for controlling CAN traffic involves decoding bits of an identifier of a CAN message from a TXD path, obtaining a weighted value using the decoded bits of the identifier, adding the weighted value to a running weighted value for received CAN messages, and throttling transmission of CAN messages via the TXD path if the running weighted value exceeds a pre-established threshold.

11 Claims, 12 Drawing Sheets

(56) References Cited

U.S. PATENT DOCUMENTS

| | | | |
|---|---|---|---|
| 2006/0171410 A1* | 8/2006 | Jung | H04L 12/40143 370/447 |
| 2007/0208470 A1* | 9/2007 | Itabashi | H04L 12/4135 701/36 |
| 2008/0159283 A1* | 7/2008 | Ishiyama | H04L 29/06 370/389 |
| 2008/0274689 A1* | 11/2008 | Kuban | H04L 1/16 455/7 |
| 2012/0210154 A1* | 8/2012 | Hartwich | H04L 12/40039 713/323 |
| 2012/0271975 A1* | 10/2012 | Elend | H04L 12/12 710/105 |
| 2013/0294460 A1* | 11/2013 | Hell | H03F 3/24 370/470 |
| 2014/0247122 A1* | 9/2014 | Moeller | B60R 25/10 340/426.25 |
| 2014/0365693 A1 | 12/2014 | Monroe et al. | |
| 2015/0063120 A1* | 3/2015 | Horvath | H04L 47/283 370/237 |
| 2015/0063371 A1* | 3/2015 | Horvath | H04L 47/826 370/461 |
| 2015/0089236 A1* | 3/2015 | Han | H04L 9/3242 713/181 |
| 2015/0172306 A1* | 6/2015 | Kim | H04L 63/1425 726/23 |
| 2015/0358351 A1 | 12/2015 | Otsuka et al. | |
| 2016/0188396 A1 | 6/2016 | Sonalker et al. | |
| 2016/0286010 A1* | 9/2016 | Lennartsson | H04L 69/08 |
| 2016/0294578 A1* | 10/2016 | Maise | H04L 12/4011 |

OTHER PUBLICATIONS

EasySYNC Ltd, Application Note AN_103, CAN Plus Message Filtering; Document Reference No. ES-000037, ver. 1.01; 8 pgs. 2010.

"Road vehicles—Controller area network (CAN)—Part 1: Data link layer and physical signalling"; ISO 2014; 58 pgs.; 2014.

Jenkins, Michael et al.; "Security Needs for the Future Intelligent Vehicles"; SAE Tecnical Paper Series, 2006-01-1426; 10 pgs.; 2006.

Extended European Search Report for Patent Appln. No. 16187896.2 (dated Jan. 17, 2017).

Matsumoto, T. et al. "A Method of Preventing Unauthorized Data Transmission in Controller Area Network", IEEE 75th Vehicular Technology Conference (VTC Spring), Yokohama, Japan, 5 pages (2012).

Hata, M. et al. "Fusei Soshin Soshi: CAN dewa sore ga Kano de aru = How to Stop Unauthorized Transmission in Controller Area Network", Computer Security Symposium, vol. 2011, No. 3, pp. 624-629 (Oct. 2011).

Extended European Search Report, 16190655, dated Jan. 25, 2017.

Non-Final Rejection dated Dec. 15, 2017 for U.S. Appl. No. 14/954,638 23 pages.

\* cited by examiner

{ EXAMPLE FOR CALCULATION OF WEIGHTED VALUES
ID = 0x2f0 = 001 1111 0000$_b$
↓↓↓ ↓↓↓↓ ↓
WEIGHT = 110 0000 1$_b$ = 161$_{dec}$ (inverse of first 8 ID bits)

FIG. 6A

POSSIBLE PER-ID IMPLEMENTATION

| IDENTIFIER | INVERSE WEIGHTING FUNCTION | ALTERNATE WEIGHTING FUNCTION | LOOK-UP TABLE FUNCTION |
|---|---|---|---|
| ID = 0x2f0<br>ID = 0x4aa<br>ID = 0x4ab<br>ID = 0x4ac | X | | |
| ID = 0x3a4 | | X | |
| ID = 0x145 | | X | |
| ID = 0x7d0 | | | X |
| ID = 0x7e0 | | | X |

FIG. 8

CONTROLLER AREA NETWORK (CAN) DEVICE AND METHOD FOR CONTROLLING CAN TRAFFIC

BACKGROUND

Controller area network (CAN) bus is a message-based communications bus protocol that is often used within automobiles. The CAN bus protocol is used to enable communications between various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898.

One growing concern with in-vehicle networks, such as in-vehicle networks that use the CAN bus protocol, is network security. One known technique for attacking an in-vehicle network such as a CAN network is a "denial of service" attack that involves "flooding" the CAN bus. For example, a CAN node of a compromised in-vehicle network is manipulated to send a burst of high priority CAN messages to prevent the rest of the CAN nodes from sending any CAN messages.

SUMMARY

Embodiments of a device and method are disclosed. In an embodiment, a method for controlling CAN traffic is disclosed. The method for controlling CAN traffic involves decoding bits of an identifier of a CAN message from a TXD path, obtaining a weighted value using the decoded bits of the identifier, adding the weighted value to a running weighted value for received CAN messages, and throttling transmission of CAN messages via the TXD path if the running weighted value exceeds a pre-established threshold.

In an embodiment of the method, obtaining a weighted value using the decoded bits of the identifier involves applying a function in which the weighting increases with increasing priority of the identifier.

In an embodiment, the method involves decreasing the running weighted value at fixed time intervals.

In an embodiment, the method involves decreasing the running weighted value by a fixed amount at fixed time intervals.

In an embodiment, the method involves decreasing the running weighted value at fixed time intervals and throttling transmission involves stopping transmission of CAN messages if the running weighted value exceeds the pre-established threshold.

In an embodiment of the method, obtaining a weighted value for the CAN message involves inverting bits of the identifier.

In an embodiment of the method, obtaining a weighted value for the CAN message involves using the decoded bits of the identifier to search a look-up table to find the weighted value.

In an embodiment of the method, obtaining a weighted value for the CAN message involves applying a function to the decoded bits of the identifier that produces a weighted value for a certain identifier that is above the pre-established threshold regardless of the running weighted value.

In an embodiment of the method, obtaining a weighted value using the decoded bits of the identifier involves applying a function in which the weighting increases with increasing priority of the identifier, and the method further includes decreasing the running weighted value by a fixed amount at fixed time intervals, and wherein throttling transmission of CAN messages involves stopping transmission of CAN messages.

In an embodiment, a CAN transceiver integrated circuit device includes a transmitter PHY, a receiver PHY, a CAN decoder, and throttle logic configured to implement the method as recited above.

A CAN device is disclosed. In an embodiment, the CAN device includes a transmit data (TXD) input interface, a CAN bus interface, a transmitter PHY connected between the TXD input interface and the CAN bus interface on a TXD path, a receive data (RXD) output interface, a receiver PHY connected between the CAN bus interface and the RXD output interface on an RXD path, a CAN decoder connected to the TXD path and configured to decode bits of an identifier from a CAN message, and throttle logic. The throttle logic is configured to obtain a weighted value using the decoded bits of the identifier, add the weighted value to a running weighted value for received CAN messages, and throttle transmission of CAN messages via the TXD path if the running weighted value exceeds a pre-established threshold.

In an embodiment of the CAN device, the throttle logic is configured to obtain a weighted value using the decoded bits of the identifier by applying a function to the decoded bits of the identifier in which the weighting increases with increasing priority of the identifier.

In an embodiment of the CAN device, the throttle logic is configured to decrease the running weighted value at fixed time intervals.

In an embodiment of the CAN device, the throttle logic is configured to decrease the running weighted value at fixed time intervals and to cause the transmission of no CAN messages until the running weighted value falls below the pre-established threshold.

In an embodiment of the CAN device, obtaining a weighted value for the CAN message involves inverting bits of the identifier.

In an embodiment of the CAN device, the throttle logic is configured to obtain a weighted value for the CAN message using the decoded bits of the identifier to search a look-up table to find the weighted value.

In an embodiment of the CAN device, the throttle logic is configured to obtain a weighted value using the decoded bits of the identifier by applying a function to the decoded bits of the identifier in which the weighting increases with increasing priority of the identifier, the throttle logic is configured to decrease the running weighted value at fixed time intervals, and the throttle logic is configured to stop the transmission of CAN messages if the running weighted value exceeds the pre-established threshold.

In an embodiment, a CAN transceiver integrated circuit device includes the transmitter PHY, the receiver PHY, the TXD input interface, the CAN bus interface, the RXD output interface, the CAN decoder, and the throttle logic as described above.

In an embodiment, a microcontroller integrated circuit device includes a CAN protocol controller and the CAN device as described above.

Another embodiment of a CAN device is disclosed. The CAN device includes a CAN decoder connected to a TXD path and configured to decode bits of an identifier from a CAN message and throttle logic. The throttle logic is configured to obtain a weighted value using the decoded bits of the identifier, add the weighted value to a running weighted value for received CAN messages, and throttle transmission of CAN messages via the TXD path if the running weighted value exceeds a pre-established threshold.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 6A illustrates a weighting function that involves inverting the first 8 bits of an identifier.

FIG. 8 depicts a table that illustrates a possible per-identifier assignment of weighting functions.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
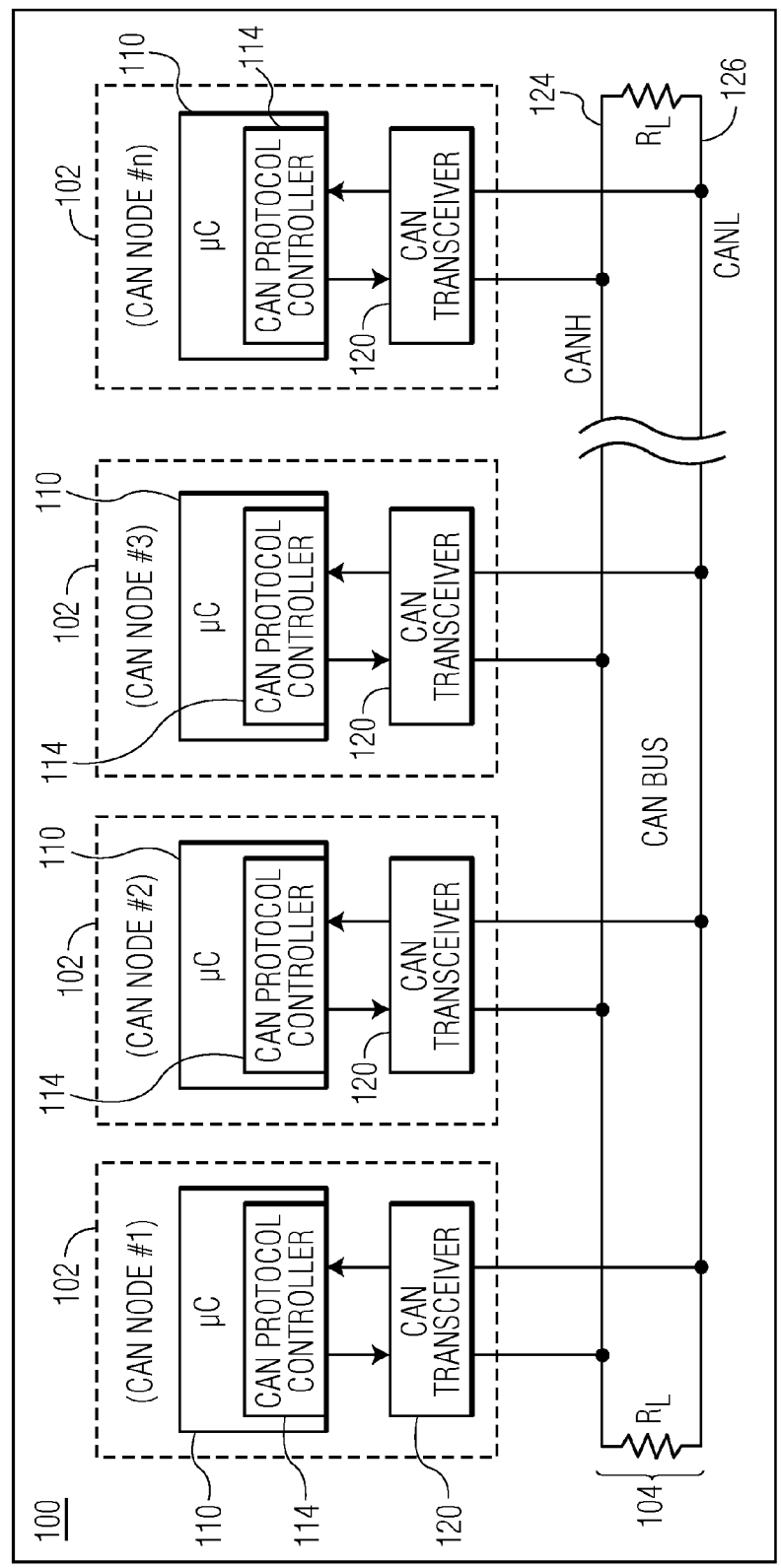
FIG. 1 depicts a CAN network that includes multiple CAN nodes connected to a CAN bus.

FIG. 1 depicts a CAN network 100 that includes multiple CAN nodes 102, also referred to as "ECUs," each connected to a CAN bus 104. In the embodiment of FIG. 1, each CAN node includes a microcontroller 110 having an embedded CAN protocol controller 114 and a CAN transceiver 120. The microcontrollers are typically connected to at least one device (not shown) such as a sensor, an actuator, or some other control device and are programmed to determine the meaning of received messages and to generate appropriate outgoing messages. The microcontrollers, also referred to as host processors, hosts, or digital signal processors (DSPs), are known in the field. In an embodiment, the host supports application software that interacts with the CAN protocol controller.

The CAN protocol controllers 114, which can be embedded within the microcontrollers 110 or external to the microcontrollers (e.g., a separate IC device), implement data link layer operations as is known in the field. For example, in receive operations, a CAN protocol controller stores received serial bits from the transceiver until an entire message is available for fetching by the microcontroller. The CAN protocol controller can also decode the CAN messages according to the standardized frame format of the CAN protocol. In transmit operations, the CAN protocol controller receives messages from the microcontroller and transmits the messages as serial bits in the CAN frame format to the CAN transceiver.

The CAN transceivers 120 are located between the microcontrollers 110 and the CAN bus 104 and implement physical layer operations (also referred to as the "PHY"). For example, in receive operations, a CAN transceiver converts analog differential signals from the CAN bus to serial digital signals that the CAN protocol controller 114 can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. The CAN bus is known in the field.

Figure 2:
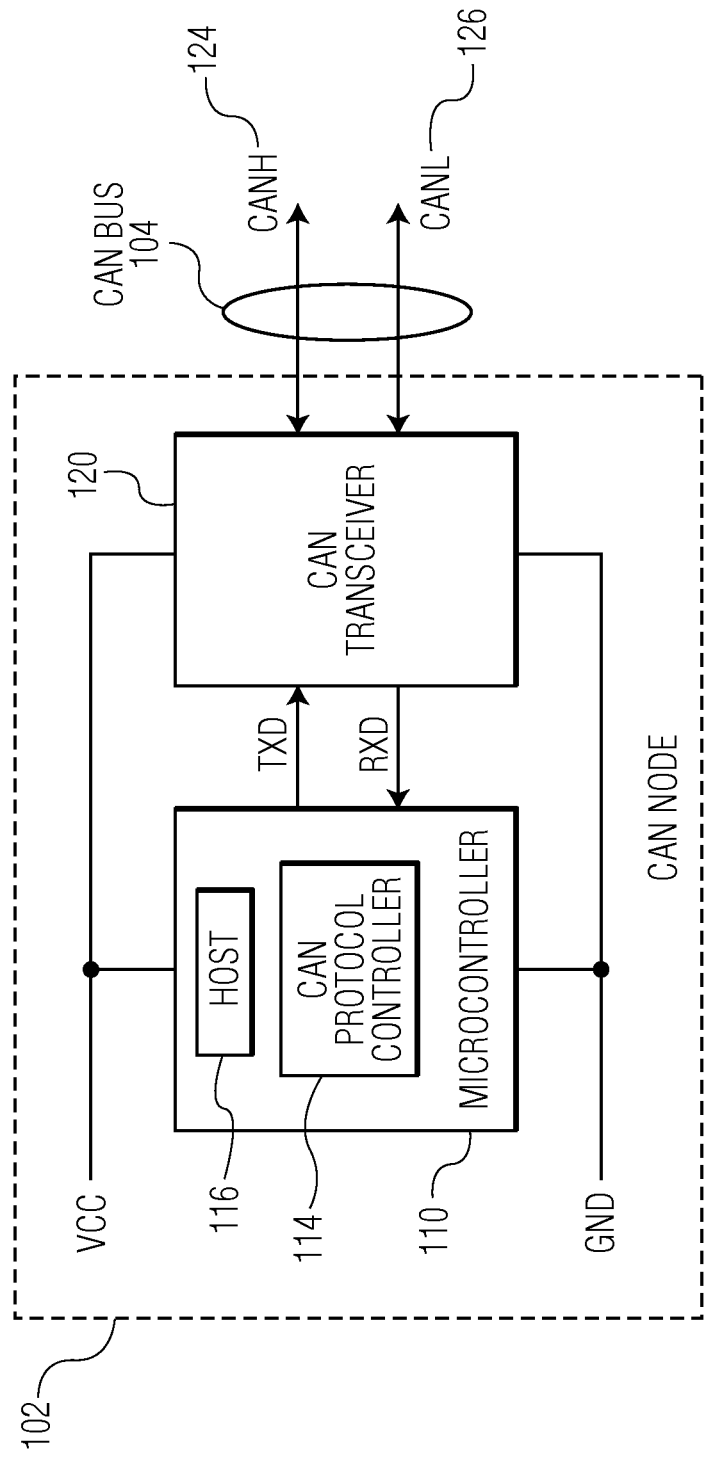
FIG. 2 depicts an expanded view of one CAN node from FIG. 1.

FIG. 2 depicts an expanded view of one CAN node 102 from FIG. 1. In the expanded view of FIG. 2, the microcontroller includes a host 116, which may be, for example, a software application that is stored in memory of the microcontroller and executed by processing circuits of the microcontroller. The microcontroller 110 and the CAN transceiver 120 of the CAN node are connected between a supply voltage, $V_{CC}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Throughout the description, TXD is carried on a TXD path and RXD is carried on an RXD path. Data is communicated to and from the CAN bus via the CANH and CANL bus lines 124 and 126, respectively.

The CAN protocol controller 114 can be configured to support the CAN normal mode or the CAN flexible data rate mode. As used herein, "CAN normal mode" (also referred to as "Classical CAN mode") refers to frames that are formatted according to the ISO 11898-1 standard and "CAN FD mode" refers to frames that are formatted according to the emerging ISO/Draft International Standard (DIS) 11898-1 standard, or an equivalent thereof.

Figure 3A:
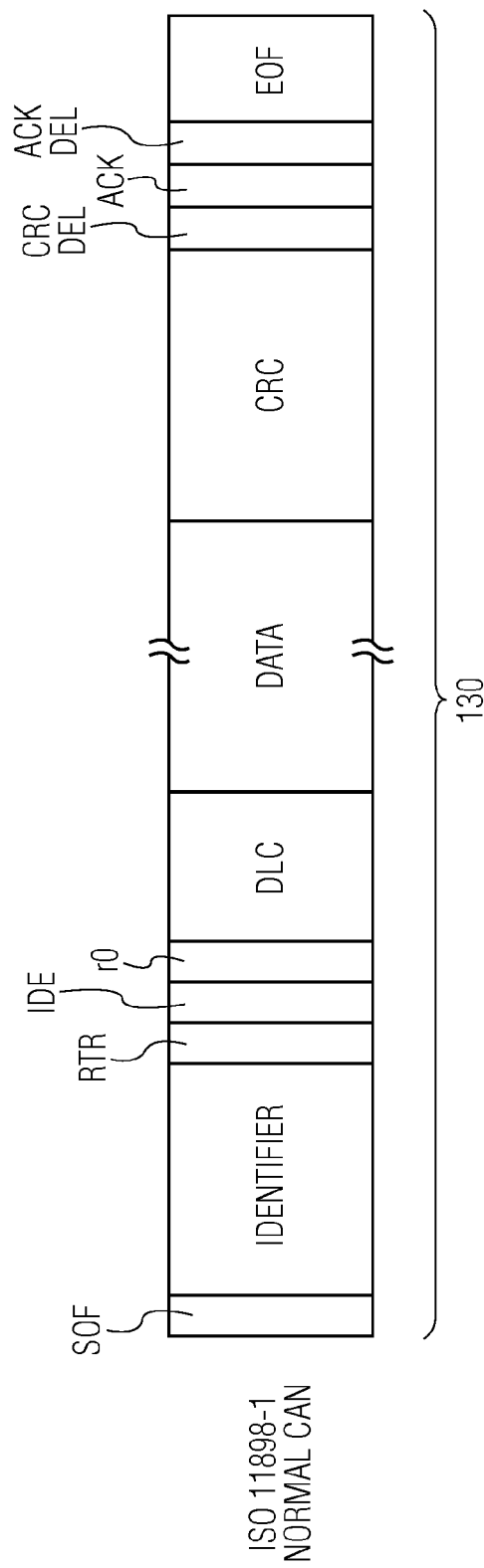
FIG. 3A depicts the format of an ISO 11898-1 frame that is used in CAN normal mode.
Figure 3B:
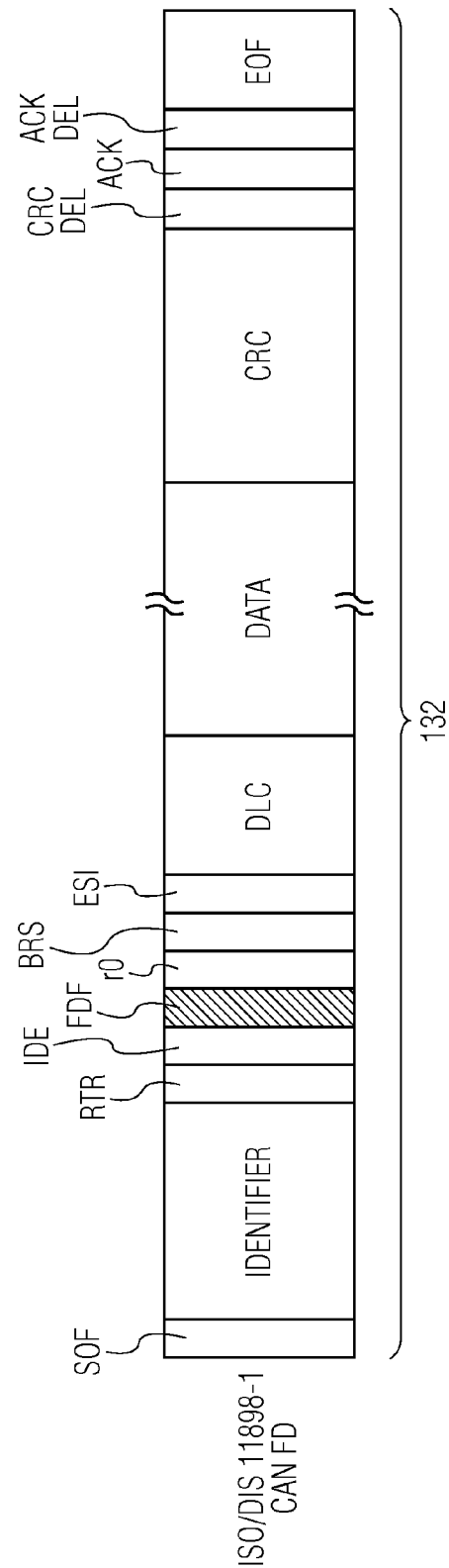
FIG. 3B depicts the format of an ISO/DIS 11898-1 frame that is used in CAN FD mode.

FIG. 3A depicts the format of an ISO 11898-1 frame 130 (in the classical base frame format (CBFF) or standard format) that is used in CAN normal mode and FIG. 3B depicts the format of an ISO/DIS 11898-1 frame 132 (in the FD base frame format or FBFF) that is used in CAN FD mode. The fields of the CAN normal mode and CAN FD mode frames are defined as follows:

SOF Start of Frame (always dominant)
IDENTIFIER Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame There is also another version of the classical frame format, referred to as "classical extended frame format (CEFF)," in which the FDF bit is in the old r1 position, whereas the FDF bit is in the r0 position in CBFF. There is also a "FD extended frame format (FEFF)", where "extended" refers to a 29-bit identifier. Of note, the CAN protocols use the reserved bit (r0 or r1) (also referred to generally as the FDF bit) within a CAN frame to identify a frame as a CAN FD mode frame. In particular, the FDF bit is a 1-bit field that indicates whether the frame is a CAN normal mode frame (ISO 11898-1) or a CAN FD mode frame (ISO/DIS 11898-1). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Figure 4A:
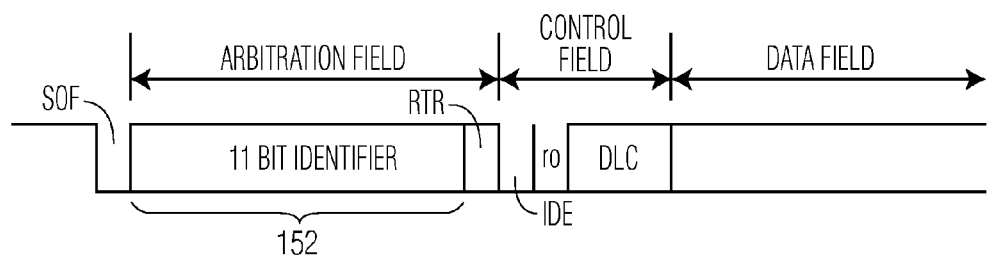
FIG. 4A depicts the IDENTIFIER field of a standard CAN frame.
Figure 4B:
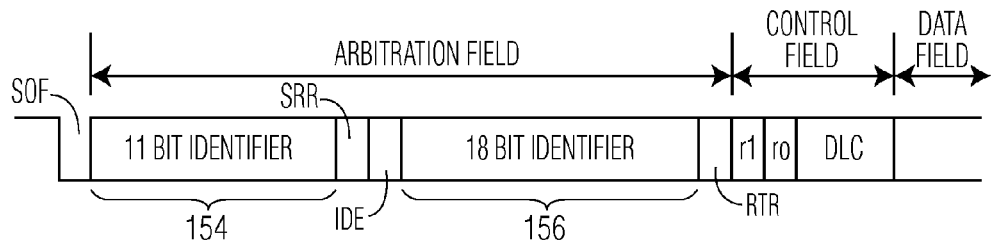
FIG. 4B depicts the IDENTIFIER field of an extended CAN frame.

CAN messages are broadcast messages and the identifier is unique to the sender CAN node. The CAN protocol controllers of the receiving CAN nodes have identifier filters that are "tuned" to certain identifiers to make sure that the host receives relevant messages and is not bothered with irrelevant messages. Standard CAN frames have an 11-bit IDENTIFIER field to carry an 11-bit identifier and extended CAN frames have a 29-bit IDENTIFIER field to carry a 29-bit identifier. The IDENTIFIER field 152 of a standard CAN frame is depicted in FIG. 4A and the IDENTIFIER field of an extended CAN frame is depicted in FIG. 4B. As shown in FIG. 4B, the 29-bit IDENTIFIER field is divided into two sections, an 11-bit base IDENTIFIER field 154 and an 18-bit extended IDENTIFIER field 156. As specified in the CAN protocol, the numerical value of the identifier sets the message priority.

One known way of attacking a CAN network involves "flooding" the CAN bus with CAN messages that have a high priority, e.g., as indicated by the identifier. When a CAN bus is flooded with high priority CAN messages, other lower priority CAN messages are essentially stuck at their respective CAN nodes as they continually lose the message arbitration. Such an attack on a CAN network is known as a "denial of service" or "DOS" attack.

To combat such denial of service attacks and in accordance with an embodiment of the invention, a technique for controlling CAN traffic involves decoding bits of an identifier of a CAN message from a TXD path, obtaining a weighted value using the decoded bits of the identifier, adding the weighted value to a running weighted value for received CAN messages, and throttling transmission of CAN messages via the TXD path if the running weighted value exceeds a pre-established threshold. When using such a technique, the weighting can be set up such that a burst of CAN messages with high priority will cause the running weighted value to quickly exceed the pre-established threshold, thereby triggering the throttling of CAN message transmissions. For example, the weighting can be set up such that the weighting increases with increasing priority of the identifier. Further, the throttling may involve stopping transmission of CAN messages from the respective CAN transceiver to effectively kill the denial of service attack. Accordingly, an attempted denial of service attack that involves sending a burst of high priority CAN messages can quickly be detected and shut down. In an embodiment, a CAN transceiver is configured with a CAN decoder and throttle logic to implement the above-described traffic control technique.

Implementing such traffic control within a CAN transceiver IC device provides a simple single-chip solution for preventing denial of service attacks that rely on flooding the CAN bus.

Figure 5:
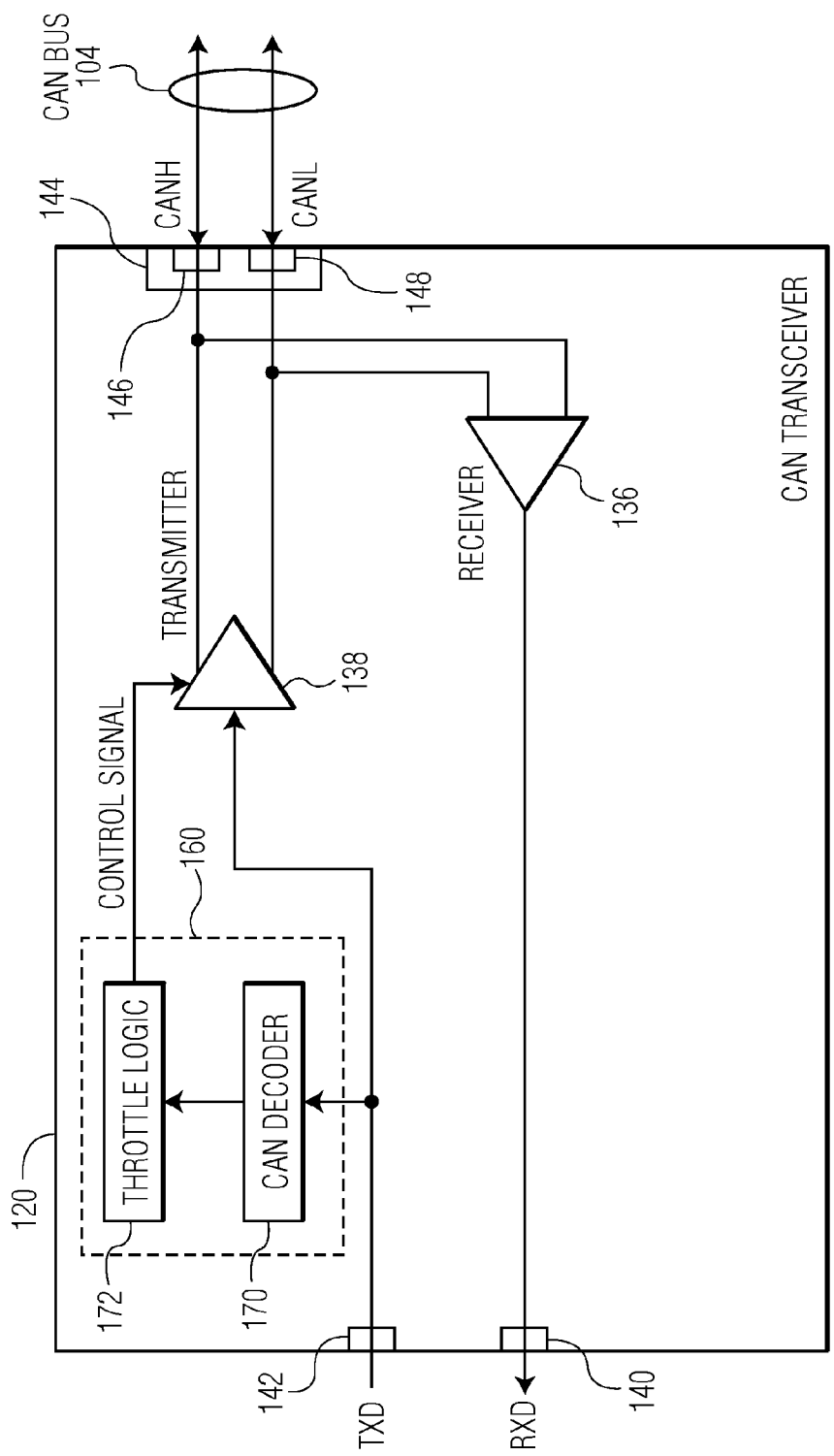
FIG. 5 depicts an embodiment of a CAN transceiver that is configured with a security module that includes a CAN decoder and throttle logic that is configured to implement weighting-based traffic control.

FIG. 5 depicts an embodiment of a CAN transceiver 120 that is configured with a security module 160 that includes a CAN decoder 170 and throttle logic 172 that is configured to implement weighting-based traffic control. The CAN transceiver 120 includes a receiver 136 (also referred to as the "receiver PHY"), a transmitter 138 (also referred to as the "transmitter PHY"), an RXD interface 140, a TXD interface 142, and a CAN bus interface 144 having a CANH bus interface 146 and a CANL bus interface 148. Incoming CAN traffic (e.g., RXD) that is received at the CAN bus interface is passed to the RXD interface 140 via the receiver and outgoing CAN traffic (e.g., TXD) that is received at the TXD interface 142 is transmitted out the CAN bus interface via the transmitter PHY. As shown in FIG. 5, the security module is connected to the TXD path. In an embodiment, the CAN transceiver is a discrete stand alone integrated circuit (IC) device that can be connected to a microcontroller IC device on a printed circuit board (PCB).

The CAN decoder 170 of the security module 160 is configured to decode serial data on the TXD path. In an embodiment, the CAN decoder is configured to decode serial data according to the CAN protocol although the CAN decoder may be configured to decode serial data according to another protocol such as Local Interconnect Network (LIN) or FLEXRAY as are known in the field of in-vehicle networking. For example, the CAN decoder is connected to the TXD path and configured to decode bits of the identifier of a CAN message and to provide the decoded bits of the identifier to the throttle logic 172. The throttle logic is configured to obtain a weighted value using the decoded bits of the identifier and to add the weighted value to a running weighted value for received CAN messages. For example, the running weighted value is maintained on a continuous (e.g., running) basis for all messages that have been transmitted onto the CAN bus 104 via the TXD path of the respective CAN node. In an embodiment, the running weighted value can be decreased at fixed time intervals. For example, the running weighted value can be decreased by a fixed amount at fixed time intervals.

The throttle logic 172 is also configured to throttle transmission of CAN messages via the TXD path and the transmitter PHY 138 if the running weighted value exceeds a pre-established threshold. In an embodiment, the throttle logic updates the running weighted value upon the receipt of each identifier and then compares the running weighted value to the pre-established threshold to determine if the pre-established threshold has been exceeded. If the pre-established threshold has been exceeded, the throttle logic generates a control signal that throttles transmission of CAN messages via the TXD path. For example, the control signal is applied to the transmitter PHY of the CAN transceiver 120 to stop transmission of CAN messages from the CAN transceiver.

In an embodiment, the CAN decoder 170 and throttle logic 172 are implemented in circuits on the same substrate as the CAN transceiver IC device. Such an integration provides a stand-alone single-chip solution to deal with denial of service attacks that rely on CAN bus flooding. The stand-alone single-chip solution can be implemented independent of the CAN protocol controller and independent of the host, making the solution easy to adopt by vehicle manufacturers.

In one embodiment, weighted values are obtained for identifiers by inverting bits of the identifier. For example, in one embodiment, the first 9 bits of the identifier, regardless of whether the identifier has 11 or 29 bits, are inverted bit-by-bit. For example, an identifier of ID=000 1010 1100$_b$ results in a weighted value of: weighted value=111 0101 00$_b$ (most significant bit). As specified in the CAN protocol, the lower the binary message identifier number, the higher the priority. Therefore, an identifier consisting of entirely zeros is the highest priority message on a CAN bus. Given the priority specification of the CAN identifiers, inverting bits of an identifier has the effect of generating higher weighted values for higher priority identifiers and lower weighted values for lower priority identifiers. For example, the weighting is set up such that relatively high weighted values are produced for relatively high priority identifiers and relatively low weighted values are produced for relatively low priority identifiers. This allows for a quick detection of a flood of high priority CAN messages. Additionally, in an embodiment, the running weighted value is decreased, for example, by one for each (arbitration) bit time that has elapsed while no CAN messages are being sent via the corresponding TXD path. In such an embodiment, a practical pre-established threshold could be for example $8192_{dec}$.

Figure 6B:
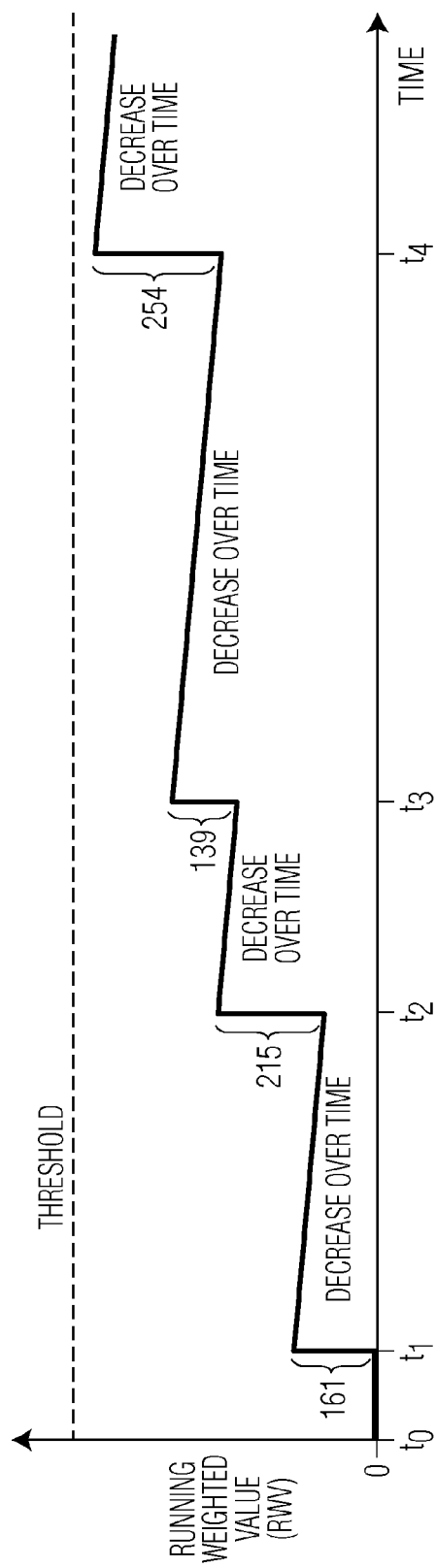
FIG. 6B illustrates a graph of the running weighted value versus time for a particular CAN node that uses the inversion function of FIG. 6A.
Figure 6C:
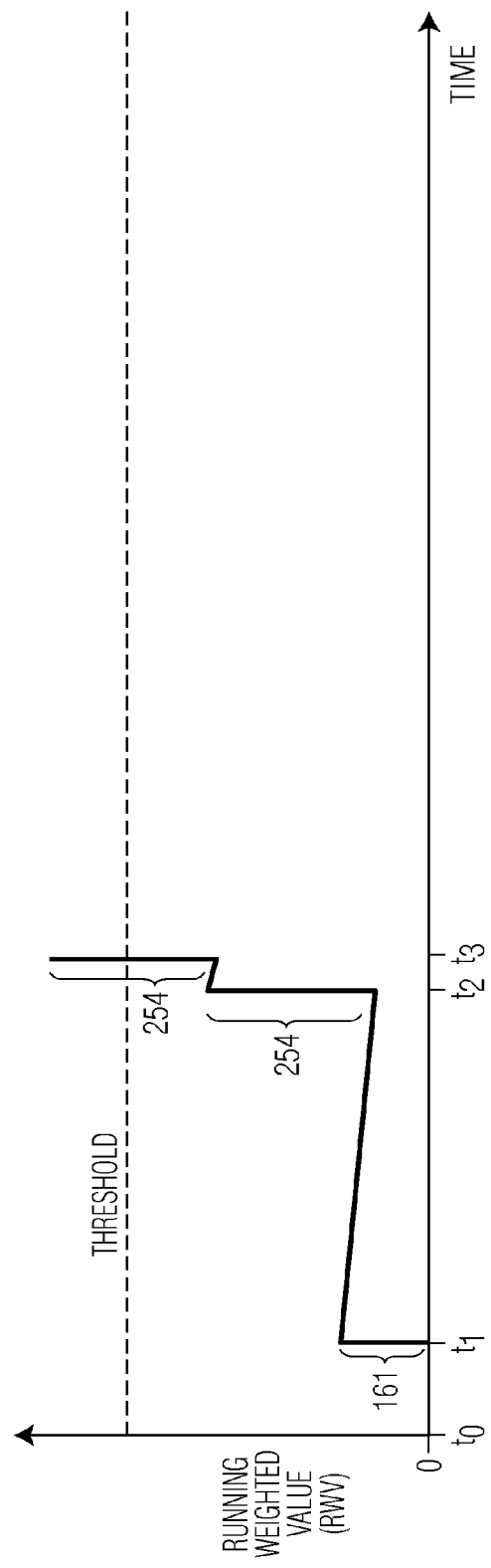
FIG. 6C illustrates a graph of the running weighted value versus time for a particular CAN node in a scenario in which the CAN node attempts to flood the CAN bus with high priority CAN messages.

FIGS. 6A-6C illustrate an embodiment of the above-described technique for controlling traffic in a CAN network. For example, the technique can be used by the CAN transceiver 120 of FIG. 5 to deal with denial of service attacks that rely on CAN bus flooding. In operation, an identifier of a CAN message is sent on the TXD path and picked up by the CAN decoder 170 of the security module 160. The CAN decoder decodes bits of the identifier on the TXD path and parses out the decoded bits of the identifier. With reference to FIG. 6A, an 11-bit identifier of ID=02× f0=001 1111 0000$_b$ is decoded and a weighted value is obtained using bits of the identifier by inverting the first 8 bits of the identifier. As illustrated in FIG. 6A, the identifier ID=02×f0=001 1111 0000$_b$ is used to generate a weighted value of: weighted value=110 0000 1$_b$=$161_{dec}$. Using the inversion function, the weighting is set up such that the weighting increases with increasing priority of the identifier.

FIG. 6B illustrates a graph of the running weighted value versus time for a particular CAN node that uses the inversion function as illustrated in FIG. 6A. At time, $t_0$, the running weighted value is at a value of, for example, 0, which may be a reset value. At time, $t_1$, the CAN node transmits a CAN message with an identifier of ID=0x2f0. Using the inversion function illustrated in FIG. 6A, a weighted value of $161_{dec}$ is obtained from the identifier and the weighted value is added to the running weighted value, which, in an example, is set to the reset value until a first CAN message is received. Between times $t_1$ and $t_2$, no CAN messages are transmitted from the CAN node and the running weighted value is decreased by a fixed amount at fixed time intervals.

At time, $t_2$, the CAN node transmits a CAN message with an identifier of ID=0x145. Using the inversion function illustrated in FIG. 6A, a weighted value of $215_{dec}$ is obtained from the identifier and the weighted value is added to the running weighted value. Between times $t_2$ and $t_3$, no CAN messages are transmitted from the CAN node and the running weighted value is decreased by a fixed amount at fixed time intervals.

At time, $t_3$ the CAN node transmits a CAN message with an identifier of ID=0x3a4. Using the inversion function illustrated in FIG. 6A, a weighted value of $139_{dec}$ is obtained from the identifier and the weighted value is added to the running weighted value. Between times $t_3$ and $t_4$, no CAN messages are transmitted from the CAN node and the running weighted value is decreased by a fixed amount at fixed time intervals.

At time, $t_4$ the CAN node transmits a CAN message with an identifier of ID=0x00f. Using the inversion function illustrated in FIG. 6A, a weighted value of $254_{dec}$ is obtained from the identifier and the weighted value is added to the running weighted value.

Between times $t_0$ and $t_4$, the running weighted value does not exceed the pre-established threshold. Therefore, no transmission throttling is implemented. For example, the running weighted value is not exceeded because the CAN node has not attempted to send a burst of high priority CAN messages.

FIG. 6C illustrates a graph of the running weighted value versus time for a particular CAN node in a scenario in which the CAN node attempts to flood the CAN bus with high priority CAN messages. At time, $t_0$, the running weighted value is at a value of, for example, 0, which may be a reset value. At time, $t_1$, the CAN node transmits a CAN message with an identifier of ID=0x2f0. Using the inversion function illustrated in FIG. 6A, a weighted value of $161_{dec}$ is obtained from the identifier and the weighted value is added to the running weighted value. Between times $t_1$ and $t_2$, no CAN messages are transmitted from the CAN node and the running weighted value is decreased by a fixed increment at fixed time intervals.

At time, $t_2$, the CAN node transmits a CAN message with an identifier of ID=0x00f. This is an identifier with a relatively high priority and using the inversion function illustrated in FIG. 6A, a weighted value of $254_{dec}$ is obtained using the identifier. The weighted value is added to the running weighted value and compared to the pre-established threshold. At this time, the running weighted value does not exceed the pre-established threshold so throttling is not implemented.

Shortly after time $t_2$, at time, $t_3$, the CAN node transmits another CAN message with an identifier of ID=0x00f and using the inversion function illustrated in FIG. 6A, a weighted value of $254_{dec}$ is again obtained using the identifier. The weighted value is added to the running weighted value and then the running weighted value is compared to the pre-established threshold. As illustrated in FIG. 6C, the attempted transmission of the second CAN message with an identifier of ID=0x00f quickly causes the running weighted value to exceed the pre-established limit. When the running weighted value exceeds the pre-established limit, the throttle logic can issue a control signal. For example, the throttle logic issues a control signal to stop the transmission of CAN messages from the CAN node. In an embodiment, the throttle logic issues a control signal that stops the transmitter PHY from transmitting the current CAN message and subsequent CAN messages, effectively ending the "flooding" of the CAN node and preventing a denial of service attack on the CAN bus. In an embodiment, the throttle logic stays in the same state (e.g., stopping transmission of CAN messages) until the state is reset by the host. In another embodiment, the throttle logic returns to a normal state (e.g., allowing the transmission of CAN messages) when the running weighted value drops below the pre-established threshold. In another embodiment, the throttle logic returns to a normal state (e.g., allowing the transmission of CAN messages) when the running weighted value drops to zero. Although some examples are given, other techniques may be used to return the throttle logic back to a normal state.

As illustrated in FIGS. 6A-6C, weighting the identifiers in such a way that higher priority identifiers have higher weighted values allows for the rapid detection and shutdown of a flooding event at a CAN node. Additionally, an advantage of the above-described technique is that the logic circuits to implement the rapid detection and shutdown of a flooding event are separate from the CAN protocol controller and the host. Therefore, software attacks on the protocol controller and/or host that trigger flooding can be detected and shut down regardless of the state of the CAN protocol controller and the host.

Figure 7:
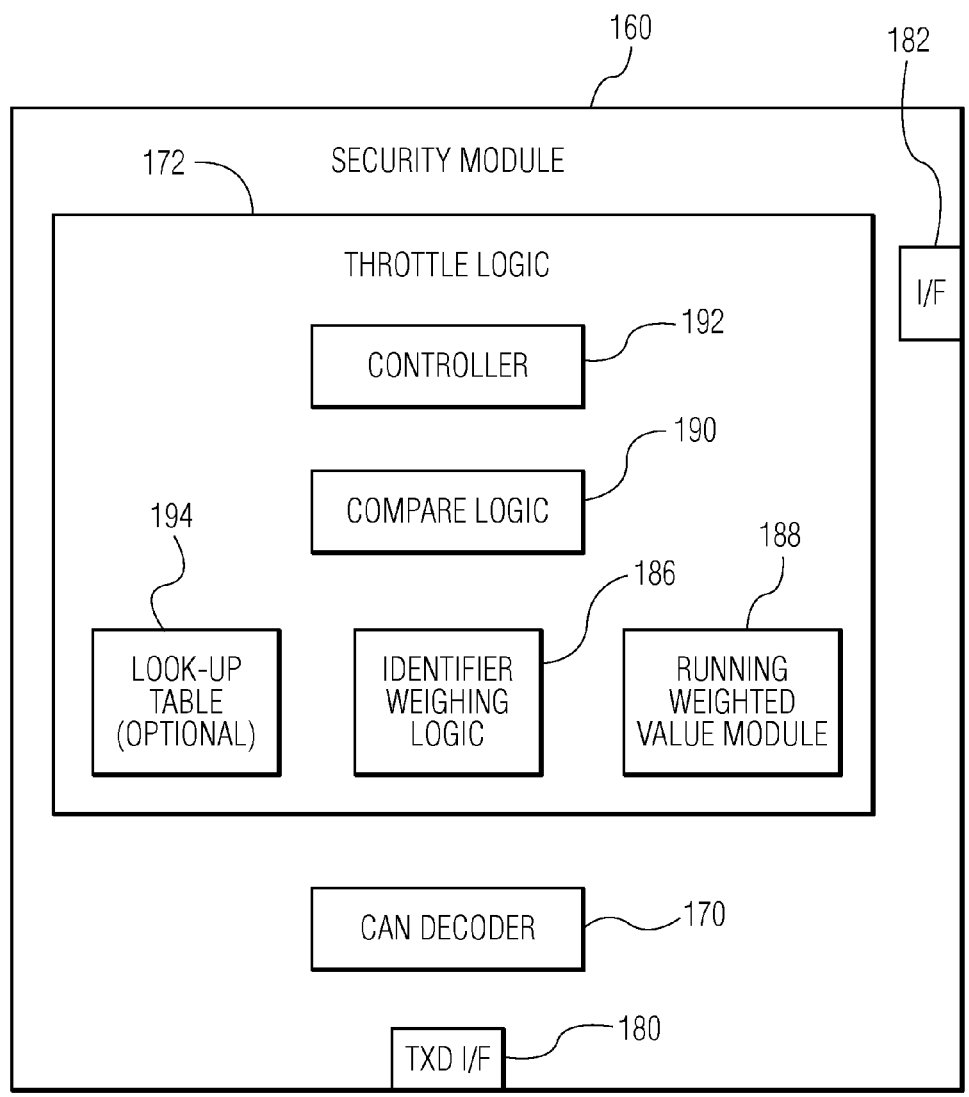
FIG. 7 depicts an embodiment of the security module from FIG. 5.

FIG. 7 depicts an embodiment of the security module 160 from FIG. 5. In the embodiment of FIG. 7, the security module includes a CAN decoder 170, throttle logic 172, a TXD interface 180, and a control signal interface 182. In an embodiment the TXD interface is connected to the TXD path (e.g., as shown in FIG. 5) to receive serial data. The serial data is passed to the CAN decoder, which decodes the received bits according to the CAN protocol. In an embodiment, the CAN decoder passes decoded bits of the identifier to the throttle logic. In the embodiment of FIG. 7, the throttle logic includes identifier weighting logic 186, a running weighted value module 188, compare logic 190, a controller 192, and an optional look-up table 194. In an embodiment, the identifier weighting logic is configured to obtain a weighted value using bits of the identifier that are received from the CAN decoder. In an embodiment, the identifier weighting logic is configured to implement the inversion function described above with reference to FIG. 5-6C. In other embodiments, the identifier weighting logic is configured to implement other functions to obtain a weighted value using bits from the identifiers. For example, there can be many different weighting functions implemented by the identifier weighting logic that will produce relatively high weighted values for relatively high priority identifiers and relatively low weighted values for relatively low priority identifiers. In an alternative embodiment, bits of the identifier are used to find a weighted value in the look-up table. In an embodiment, the look-up table is populated with weighted values that correspond to the identifiers and the table is searched using decoded bits of an identifier. In an embodiment, the look-up table may include mask bits that are used to identify groups of identifiers. In an embodiment, the look-up table can be used to obtain a weighted value for certain specified identifiers by, for example, searching the table to find a match. In this way, if a CAN node with compromised software pretends to be, for example, off-board test equipment that would typically use a particular predefined identifier or set of predefined identifiers, the particular predefined identifier can be included in the look-up table and given a relatively high weighted value. For example, the weighted value could be high enough to exceed the pre-established threshold very quickly or immediately, e.g., after only a single CAN message or after only a couple of CAN messages, regardless of the running weighted value. That is, when the weighted value is added to the current running weighted value, the new running weighted value will for sure exceed the pre-established threshold regardless of the magnitude of the running weighted value before the addition.

The running weighted value module 188 may include a register to store the running weighted value and logic to update the running weighted value. In an embodiment, the running weighted value module includes logic to update the running weighted value in response to the weighted values and to decrease the running weighted value at fixed time intervals when CAN messages are not being transmitted. In one embodiment, the running weighted value is decreased once per bit time by a value that causes the running weighted value to go to zero within about one second.

The compare logic 190 is configured to compare the running weighted value with a pre-established threshold. When the compare logic determines that the running weighted value exceeds the pre-established threshold, an indicator signal can be output to the controller 192. The controller is configured to generate a control signal that is output from the control interface 182 to control transmission of CAN messages from the corresponding CAN node, e.g., specifically from the CAN transceiver. In an embodiment, the control signal is used to throttle the transmitter PHY (FIG. 5, transmitter PHY 138) as described above. In an embodiment, the controller may be configured to output control signals that control the transmission of CAN messages in different ways depending on the desired outcome of the traffic control.

In an embodiment, the security module 160 is implemented in hardware circuits that are fabricated on the same substrate as the circuits that constitute the CAN transmitter. Hardware circuit may include, for example, transistors and diodes fabricated using CMOS technology as is known in the field.

In an embodiment, the throttle logic 172 is configured to apply different weighting functions depending on the identifier. FIG. 8 depicts a table that illustrates a possible per-identifier assignment of weighting functions. In the first column of the table, identifiers are indicated. For example, five rows of identifiers are included with at least one row including multiple identifiers that effectively represent a "category" of identifiers. In the second column of the table, an inverse weighting function is identified and the check mark in the top row indicates that the corresponding identifiers are weighted according to the inverse weighting function. In the third column of the table, an alternate weighting function is identified and the check marks in rows two and three indicate the identifiers that are weighted according to the alternate weighting function. In the fourth column of the table, a look-up table function is identified and the check marks in rows four and five indicate the identifiers that are weighted according to the look-up table function. As indicated in the table of FIG. 8, different weighting functions can be applied to different identifiers depending on the desired traffic control needs.

Figure 9:
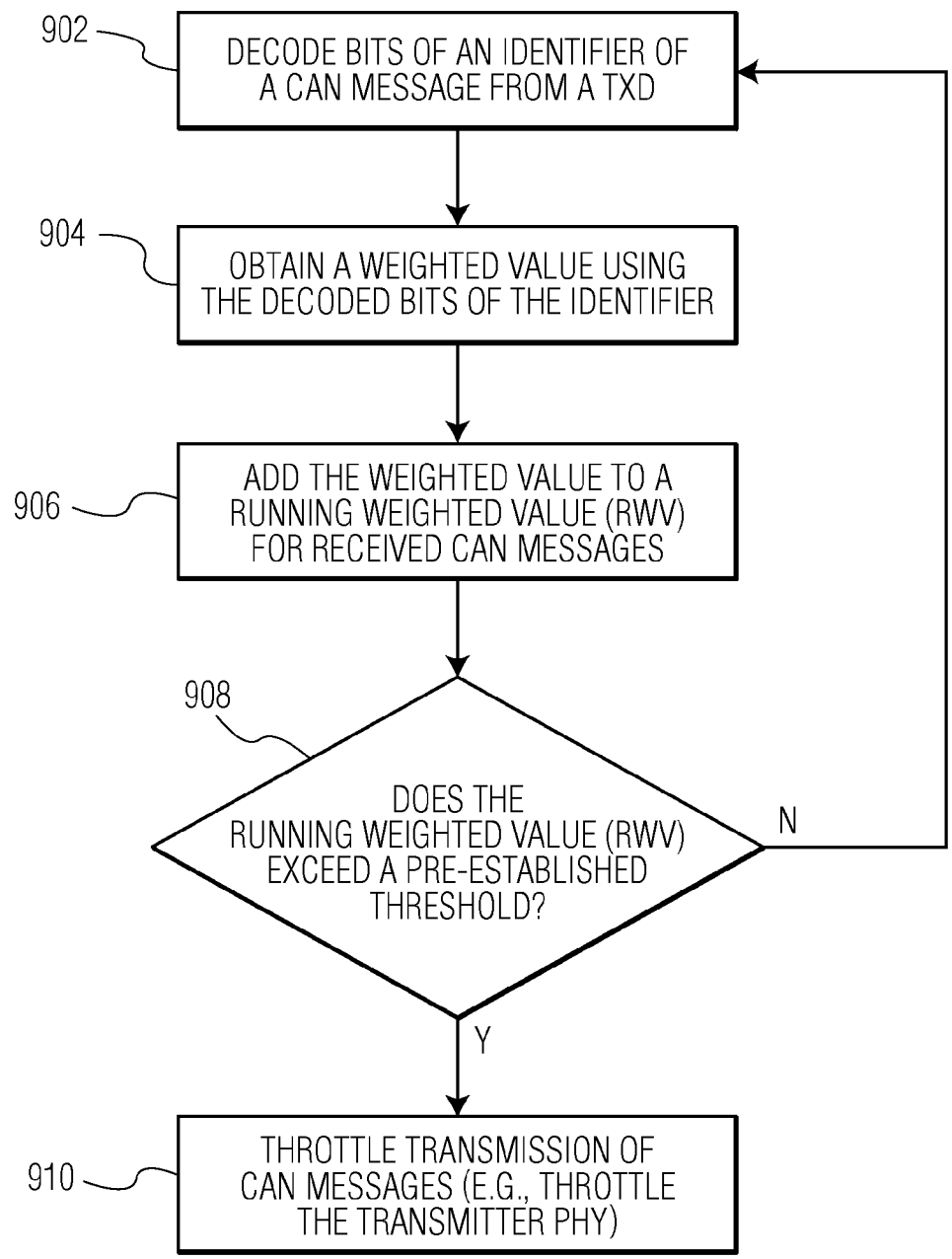
FIG. 9 is a process flow diagram of a method for controlling CAN traffic in accordance with an embodiment of the invention.

FIG. 9 is a process flow diagram of a technique for controlling CAN traffic. At block 902, bits of an identifier of a CAN message from a TXD path are decoded. At block 904, a weighted value is obtained using the decoded bits of the identifier. At block 906, the weighted value is added to a running weighted value (RWV) for received CAN messages. At decision point 908, it is determined if the running weighted value exceeds the pre-established threshold. If the running weighted value does not exceed the pre-established threshold, then, the process returns to block 902. However, if the running weighted value does exceed the pre-established threshold, then, at block 910, transmission of CAN messages via the TXD path is throttled. In an embodiment, the transmission of CAN messages is throttled by controlling the transmitter PHY, e.g., by controlling the transmitter PHY to stop transmitting CAN messages. In another embodiment, the transmission of CAN messages is throttled by controlling the transmitter PHY, e.g., by controlling the transmitter PHY to slow the transmission rate of CAN messages.

As described above, in some embodiments, the weighting function uses less than all of the bits of an identifier to obtain the weighted value. In other embodiments, all of the bits of an identifier may be used to obtain a weighted value. In both cases, bits of the identifier are being used to obtain a weighted value.

Although some examples of obtaining a weighted value using bits of an identifier are described, other techniques are possible. For example, many different functions of the identifier (or some bits of the identifier) are possible. In an embodiment, the weighted value is expressed as: weighted value=f(identifier), where "f" is some function. The function, f, could be, for example, continuous or discontinuous. An example of an alternative function is: weighted value= $(2^{29}-\text{identifier})^2$, although other functions are possible.

As described above, the running weighted value is compared to a pre-established threshold. The particular threshold is implementation specific and can be set based on many different factors. In an embodiment, considerations in setting the pre-established threshold include what are the identifiers that are being sent and how often are the identifiers being sent in a certain time period (e.g., in 1 second). With these factors known, the running weighted value can be calculated for the end of the certain time period (e.g., 1 second) in a scenario where there is no flooding and no throttling of the traffic. Such a running weighted value can be called the "1-second running weighted value" or "RWV_1 s." A pre-established threshold could then be set based on the 1-second running weighted value (RWV_1 s) and an example could be 0.5 times RWV_1 s. In an embodiment, setting the pre-established threshold such that the ratio between the pre-established threshold and RWV_1 s is low results in a lower possibility of bursts of the corresponding CAN messages. In a scenario in which a continuous, uniform, smooth stream of CAN messages is expected, a lower pre-established threshold can be used and may be favorable. For example, a pre-established threshold of less than 0.5 times RWV_1 s may be used. In a scenario in which an irregular stream of CAN messages (e.g., with bursts and pauses) is expected, a higher pre-established threshold can be used and may be favorable. For example, a higher pre-established threshold of close to 1.0 times RWV_1 s may be used. In an embodiment, the throttle logic is configured to decrease the running weighted value at fixed time intervals of, for example, once per bit time. In an embodiment, the throttle logic is configured to decrease the running weighted value by a fixed amount each time interval with the fixed amount being set such that the running weighted value is decreased to zero within about 1 second. For example, the running weighted value is decreases such that RWV_1 s=0 within 1 second. In an embodiment, the running weighted value is decreased to about zero (e.g., ±10%) within 1 second.

As described above, an attempt to "flood" the CAN network can be detected when the running weighted value exceeds the pre-established threshold. In an embodiment, the number of CAN messages that cause the running weighted value to exceed the pre-established threshold is a function of the weighted values that are obtained from the bits of the identifiers. Therefore, the combination of the weighted value function(s) and the pre-established threshold affect the performance in a working network. The particular combination of weighted value function(s) and pre-established threshold is implementation specific.

Using the above-described technique for controlling CAN traffic, it is possible to run a high number of messages with low priority identifiers without throttling or disrupting the communication, e.g., to allow for fast software downloads, while also throttling an attempt to flood the CAN bus with high priority CAN messages.

In an embodiment, the above-described flooding detection and prevention techniques can be implemented in a CAN device such as a CAN transceiver IC device, a microcontroller IC device, or an IC device that includes both a CAN transceiver and a microcontroller.

In an embodiment, the above-described flooding detection and prevention techniques are applicable to CAN, CAN-FD, and ISO11898 compliant networks as well as to other network protocols that are often used in vehicles such as Local Interconnect Network (LIN) and FLEXRAY protocols.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for controlling Controller Area Network (CAN) traffic, the method comprising:
    receiving a CAN message as serial data at a transmit data (TXD) input interface of a CAN transceiver from a CAN protocol controller, wherein the CAN message includes an arbitration field;
    decoding bits of an identifier in the arbitration field of the received CAN message, wherein the CAN message is decoded from the serial data that is on a TXD path within the CAN transceiver, wherein the TXD path lies between the TXD input interface of the CAN transceiver and a transmitter of the CAN transceiver;
    obtaining a weighted value using the decoded bits of the identifier, wherein obtaining a weighted value using the decoded bits of the identifier involves applying a function in which the weighting increases with increasing priority of the identifier, wherein the priority of the identifier is determined by the binary value of the identifier with the lowest binary value corresponding to the highest priority and the highest binary value corresponding to the lowest priority;
    adding the weighted value to a running weighted value for received CAN messages;
    decreasing the running weighted value by a fixed amount at fixed time intervals; and
    throttling transmission of CAN messages, which are transmitted from the CAN transceiver via the TXD path, if the running weighted value exceeds a pre-established threshold, wherein throttling transmission of CAN messages comprises stopping transmission of CAN messages from the CAN transceiver.

2. The method of claim 1 wherein obtaining a weighted value for the CAN message involves inverting bits of the identifier.

3. The method of claim 1 wherein obtaining a weighted value for the CAN message involves using the decoded bits of the identifier to search a look-up table to find the weighted value.

4. The method of claim 1 wherein obtaining a weighted value for the CAN message involves applying a function to the decoded bits of the identifier that produces a weighted value for a certain identifier that is above the pre-established threshold regardless of the running weighted value.

5. A CAN transceiver integrated circuit device comprising the CAN transceiver, which includes a transmitter physical layer (PHY), a receiver PHY, a CAN decoder, and throttle logic, configured to implement the method as recited in claim 1.

6. A Controller Area Network (CAN) transceiver comprising:
    a transmit data (TXD) input interface, the TXD input interface for receiving data from a CAN protocol controller;
    a CAN bus interface;
    a transmitter physical layer (PHY) connected between the TXD input interface and the CAN bus interface on a TXD path;
    a receive data (RXD) output interface;
    a receiver PHY connected between the CAN bus interface and the RXD output interface on an RXD path;
    a CAN decoder connected to the TXD path and configured to decode bits of an identifier of an arbitration field from a CAN message that is carried on the TXD path, wherein the CAN decoder is separate from the CAN protocol controller; and
    throttle logic configured to:
        obtain a weighted value using the decoded bits of the identifier, wherein obtaining a weighted value using the decoded bits of the identifier involves applying a function in which the weighting increases with increasing priority of the identifier, wherein the priority of the identifier is determined by the binary value of the identifier with the lowest binary value corresponding to the highest priority and the highest binary value corresponding to the lowest priority;
        add the weighted value to a running weighted value for received CAN messages;
        decrease the running weighted value by a fixed amount at fixed time intervals; and
        throttle transmission of CAN messages, which are transmitted from the CAN bus interface via the transmitter PHY and the TXD path, if the running weighted value exceeds a pre-established threshold, wherein throttling transmission of CAN messages comprises stopping transmission of CAN messages from the CAN transceiver.

7. The CAN transceiver of claim 6 wherein obtaining a weighted value for the CAN message involves inverting bits of the identifier.

8. The CAN transceiver of claim 6 wherein the throttle logic is configured to obtain a weighted value for the CAN message using the decoded bits of the identifier to search a look-up table to find the weighted value.

9. The CAN transceiver of claim 6, wherein the CAN device comprises a CAN transceiver integrated circuit device that includes the transmitter PHY, the receiver PHY, the TXD input interface, the CAN bus interface, the RXD output interface, the CAN decoder, and the throttle logic.

10. A microcontroller integrated circuit device comprising a CAN protocol controller and the CAN transceiver as recited in claim 6.

11. A Controller Area Network (CAN) device comprising:
 a CAN decoder connected to a transmit data (TXD) path and configured to decode bits of an identifier of an arbitration field from a CAN message that is received from a CAN protocol controller and carried on the TXD path within the CAN device, wherein the CAN decoder is separate from the CAN protocol controller and wherein the TXD path within the CAN device lies between a TXD interface of the CAN device and a CAN bus interface of the CAN device; and throttle logic configured to:
 obtain a weighted value using the decoded bits of the identifier, wherein obtaining a weighted value using the decoded bits of the identifier involves applying a function in which the weighting increases with increasing priority of the identifier, wherein the priority of the identifier is determined by the binary value of the identifier with the lowest binary value corresponding to the highest priority and the highest binary value corresponding to the lowest priority;
 add the weighted value to a running weighted value for received CAN messages;
 decrease the running weighted value by a fixed amount at fixed time intervals; and
 throttle transmission of CAN messages, which are transmitted from the CAN bus interface of the CAN device via the TXD path, if the running weighted value exceeds a pre-established threshold, wherein throttling transmission of CAN messages comprises stopping transmission of CAN messages.

* * * * *